United States Patent
Ferreira da Silva

(10) Patent No.: US 12,114,655 B2
(45) Date of Patent: Oct. 15, 2024

(54) AGRICULTURAL COMPOSITIONS AND METHODS OF USE THEREOF

(71) Applicant: Valent U.S.A. LLC, San Ramon, CA (US)

(72) Inventor: Eduardo Chagas Ferreira da Silva, Savoy, IL (US)

(73) Assignee: VALENT U.S.A., LLC, San Ramon, CA (US)

( * ) Notice: Subject to any disclaimer, the term of this patent is extended or adjusted under 35 U.S.C. 154(b) by 0 days.

(21) Appl. No.: 18/360,923

(22) Filed: Jul. 28, 2023

(65) Prior Publication Data

US 2023/0363381 A1 Nov. 16, 2023

Related U.S. Application Data

(63) Continuation of application No. 17/123,546, filed on Dec. 16, 2020, now Pat. No. 11,744,245.

(60) Provisional application No. 62/949,604, filed on Dec. 18, 2019.

(51) Int. Cl.
  *A01N 25/22* (2006.01)
  *A01N 41/12* (2006.01)

(52) U.S. Cl.
  CPC .............. *A01N 25/22* (2013.01); *A01N 41/12* (2013.01)

(58) Field of Classification Search
  CPC ......... A01N 25/22; A01N 41/12; A01N 35/10
  See application file for complete search history.

(56) References Cited

U.S. PATENT DOCUMENTS

2018/0255772 A1* 9/2018 Flemmens .............. A01P 13/00

OTHER PUBLICATIONS

ScienceMadness, Sorbitol, 2017, 2 pages. (Year: 2017).*

* cited by examiner

*Primary Examiner* — Trevor Love
(74) *Attorney, Agent, or Firm* — Wood, Phillips, Katz, Clark & Mortimer

(57) ABSTRACT

The present invention is directed to an agricultural composition comprising an acetyl coenzyme-A carboxylase (ACCase) inhibitor, one or more sugar alcohols and optionally, one or more auxin herbicides. The present invention is further directed to a method of controlling weeds comprising applying concurrently or sequentially an ACCase inhibitor and one or more sugar alcohols, and optionally one or more auxin herbicides to the weeds or an area in need of weed control.

9 Claims, No Drawings

AGRICULTURAL COMPOSITIONS AND METHODS OF USE THEREOF

FIELD OF THE INVENTION

The present invention relates to an agricultural composition comprising an acetyl coenzyme-A carboxylase (AC-Case) inhibitor, one or more sugar alcohols and optionally, one or more auxin herbicides. The present invention further relates to a method of controlling weeds comprising applying concurrently or sequentially an ACCase inhibitor and one or more sugar alcohols, and optionally one or more auxin herbicides to the weeds or an area in need of weed control.

BACKGROUND OF THE INVENTION

Unwanted plants, such as weeds, reduce the amount of resources available to crop plants and can have a negative effect on crop plant yield and quality. For example, a weed infestation reportedly was responsible for an 80% reduction in soybean yields. Bruce, J. A., and J. J. Kells, Horseweed (*Conyza canadensis*) control in no-tillage soybeans (*Glycine max*) with preplant and preemergence herbicides, Weed Technol, 1990, 4, 642-647. Unwanted plants in crop plant environments include broadleaves, grasses and sedges. To save time, money and resources grass herbicides are often mixed with broadleaf herbicides to control a range of weeds.

As mentioned above, one way to control multiple weeds is to apply multiple herbicides sequentially or concurrently. However, when applying multiple herbicides, care must be taken to ensure that each of the herbicides are stable in their composition and effective when combined in either a formulation, a tank mix or after application.

Acetyl coenzyme-A carboxylase ("ACCase") inhibitors are herbicides that primarily control grasses. These herbicides have been used successfully for over 40 years to control grasses in crop plants. ACCase inhibitors are not effective against broadleaf weeds.

Auxin herbicides primarily control broadleaf weeds. These herbicides have been used successfully for over 60 years to control broadleaf weeds in cereal crops. Auxin herbicides are not effective against grasses.

Accordingly, there is a need in the art for a composition containing ACCase inhibitors that is effective when combined with auxin herbicides to save time, money and resources. This composition should be stable and effective upon application.

SUMMARY OF THE INVENTION

The present invention is directed to an agricultural composition comprising an acetyl coenzyme-A carboxylase ("ACCase") inhibitor, one or more sugar alcohols and optionally, one or more auxin herbicides.

The present invention is further directed to a method of controlling weeds comprising applying concurrently or sequentially an ACCase inhibitor and one or more sugar alcohols, and optionally one or more auxin herbicides to the weeds or an area in need of weed control.

DETAILED DESCRIPTION OF THE INVENTION

The Applicant has unexpectedly discovered that the addition of one or more sugar alcohols to agricultural compositions containing an acetyl coenzyme-A carboxylase inhibitor ("ACCase inhibitor") provides stable composition and effective application when combined with auxin herbicides.

In one embodiment, the present invention is directed to an agricultural composition comprising an ACCase inhibitor and one or more sugar alcohols.

As used herein the term "acetyl coenzyme-A carboxylase inhibitor" or "ACCase inhibitors" refers, but is not limited to, tetronic and tetramic acid derivatives such as spirodiclofen, spiromesifen and spirotetramat; aryloxyphenoxypropionates (FOPs) such as cyhalofop-butyl, diclofop-methyl, fenoxaprop-P-ethyl, fluazifop-P-butyl, quizalofop, clodinafop-propargyl, metamifop and haloxyfop-R-methyl; cyclohexanediones (DIMs) such as clethodim, sethoxydim, profoxydim and tralkoxydim; and phenylpyrazolines such as pinoxaden.

In a preferred embodiment the ACCase inhibitor is selected from the group consisting of clethodim, fluazifop-P-butyl and haloxyfop-R-methyl. In a more preferred embodiment, the ACCase inhibitor is clethodim.

In another preferred embodiment, the ACCase inhibitor may be present in compositions of the present invention at a concentration from about 0.1% to about 99.9% w/v, more preferably from about 1% to about 99% w/v.

In another preferred embodiment, the one or more sugar alcohols is selected from the group consisting of D-mannitol, D-sorbitol, maltitol, erythritol, L-arabitol, xylitol, 1D-chiro-inositol, inositol, myoinositol, galactinol, L-quebrachitol, D-pinitol, D-ononitol, D-myo-inositol-1,3-diphosphate and galactinol. In a more preferred embodiment, the one or more sugar alcohols is D-sorbitol.

In another preferred embodiment, the one or more sugar alcohols may be present in compositions of the present invention at a concentration from about 0.1% to about 99.9% w/v, more preferably from about 1% to about 99% w/v.

In another embodiment, the compositions of the present invention further comprise one or more auxin herbicides.

In a preferred embodiment, the one or more auxins is selected from the group consisting of dicamba, 2,4-D, dichloroprop, (4-chloro-2-methylphenoxy)acetic acid (MCPA), 4-(4-chloro-2 methylphenoxy)butanoic acid (MCPB), mecoprop, picloram, quinclorac, triclopyr, fluroxypyr, picloram, aminopyralid, clopyralid and aminocyclopyrachlor and agricultural acceptable salts and esters thereof. In a more preferred embodiment, the one or more auxins is a salt of dicamba. In an even more preferred embodiment, the salt of dicamba is selected from the group consisting of dicamba-biproamine, dicamba-diglycolamine, and dicamba-tetrabutylamine.

In another preferred embodiment, the one or more auxins may be present in compositions of the present invention at a concentration from about 0.1% to about 99.9% w/v, more preferably from about 1% to about 99% w/v.

The compositions of the present invention may further comprise one or more excipients selected from the group consisting of solvents, anti-caking agents, stabilizers, anti-foaming agents, slip agents, humectants, dispersants, wetting agents, thickening agents, emulsifiers, anti-freeze agents and preservatives. Other components that enhance the biological activity of these ingredients may optionally be included.

The compositions of the present invention can be applied by any convenient means. Those skilled in the art are familiar with the modes of application that include foliar applications such as spraying, chemigation (a process of applying the mixture through the irrigation system), by granular application, or by impregnating the mixture on fertilizer.

The compositions of the present invention can be prepared as concentrate formulations, as ready-to-use formulations or as a tank mix.

In another embodiment, the present invention is further directed to a method of controlling weeds comprising applying concurrently or sequentially an ACCase inhibitor and one or more sugar alcohols and optionally, one or more auxin herbicides to the weeds or an area in need of weed control.

In a preferred embodiment, the ACCase inhibitor may be applied at a rate from about 1 to about 1,000 grams per hectare ("g/HA"), more preferably from about 1 to about 100 g/HA and even more preferably from about 30 to about 70 g/HA and yet even more preferably from about 40 to about 60 g/HA and most preferably at about 55.4 g/HA.

In another preferred embodiment, the one or more sugar alcohols may be applied at a rate from about 100 to about 100,000 g/HA, more preferably from about 1,000 to about 30,000 g/HA and even more preferably from about 1,700 to about 27,200 g/HA and yet even more preferably at about 1,700, about 3,400, about 6,800, about 13,600 and about 27,200 g/HA and most preferably at about 6,800 g/HA.

In another preferred embodiment, the one or more auxin herbicides may be applied at a rate from about 1 to about 1,000 g/HA, more preferably from about 10 to about 100 g/HA.

In another embodiment, the weed controlled by the compositions of the present invention is at least one of Waterhemp (*Amaranthus tuberculatus*), Horseweed (*Conyza Canadensis*), Ivyleaf Morningglory (*Ipomoea hederacea*), Pitted Morningglory (*Ipomoea lacunose*), Common Ragweed (*Ambrosia artemisiifolia*), Giant Ragweed (*Ambrosia trifida*), Large Crabgrass (*Digitaria sanguinalis*), Palmer Amaranth (*Amaranthus palmeri*), Broadleaf Signalgrass (*Brachiaria platyhylla*), Common Barnyardgrass (*Echinochloa crus-galli*), Yellow Nutsedge (*Cyperus esculentus*), Eclipta (Eclipta prostrate), Lambsquarters (*Chenopodium* species), Velvetleaf (*Abutilon theophrasti*), Foxtail (*Setaria* species), Giant Foxtail (*Setaria faberi*) and annual grasses. As used herein, annual grasses include corn, sorghums, wheat, rye, barley, and oats.

In another embodiment, the area in need of weed control may include any area that is desired to have a reduced number of weeds or to be free of weeds. For example, compositions of the present invention may be applied to an area used to grow crop plants, such as a field orchard, or vineyard. Mixtures of the present invention can also be applied to non-agricultural areas in need of weed control such as lawns, golf courses, or parks.

As used herein, all numerical values relating to amounts, weight percentages and the like are defined as "about" or "approximately" each particular value, plus or minus 10%. For example, the phrase "at least 5.0% by weight" is to be understood as "at least 4.5% to 5.5% by weight." Therefore, amounts within 10% of the claimed values are encompassed by the scope of the claims.

Throughout the application, the singular forms "a," "an," and "the" include plural reference unless the context clearly dictates otherwise.

These representative embodiments are in no way limiting and are described solely to illustrate some aspects of the invention.

These representative embodiments are in no way limiting and are described solely to illustrate some aspects of the invention.

Further, the following examples are offered by way of illustration only and not by way of limitation.

EXAMPLES

Agridex® is a crop oil concentrate and is a registered trademark of and available from Bayer CropScience.

Induce® is an alkyl aryl polyoxylkane ethers and free fatty acids and is a registered trademark of and available from Helena Chemical Company.

Select Max® was used as the source of clethodim and is a registered trademark of and available from Valent U.S.A., LLC. Select Max® contains 12.6% by weight clethodim.

Example 1—Mannitol and Sorbitol Increase Performance of Clethodim in Corn 4 trials were conducted on the efficacy of clethodim with or without mannitol or sorbitol. Specifically, 4 plots of corn were grown to 12 inches in height. These plots were placed in a spray chamber for treatment. All compositions contained 1% v/v of Agridex® and 0.25% v/v of Induce®. Treatments and results can be found in Table 1, below.

TABLE 1

| Treatment | Application Rate (Grams per Hectare) | Days After Treatment (% control) 14 |
|---|---|---|
| Untreated Control | 0 | 0 |
| Clethodim | 55.4 | 20.8 |
| Clethodim Mannitol | 55.4 6800 | 30 |
| Clethodim Sorbitol | 55.4 6800 | 92.2 |

As seen in Table 1, above, at 14 DAT there was a nearly 10% increase in control of corn by clethodim+mannitol (30%) compared to clethodim alone (20.8%) and nearly a 71% increase in control by clethodim+sorbitol (92.2%). Increased activity observed as more efficient and fast death of the whorl as well as a more complete death of the entire plant, and less regrowth of corn plants.

What is claimed is:

1. An agricultural composition comprising clethodim and sorbitol.

2. An agricultural composition comprising clethodim and D-sorbitol.

3. A method of controlling weeds comprising applying concurrently or sequentially clethodim and sorbitol to the weeds or an area in need of weed control.

4. The method of claim 3, wherein ACCase inhibitor is applied at a rate from about 1 to about 100 grams per hectare.

5. The method of claim 3, wherein the ACCase inhibitor is applied at a rate from about 30 to about 70 grams per hectare.

6. The method of claim 3, wherein the ACCase inhibitor is applied at a rate of 55.4 grams per hectare.

7. The method of claim 3, wherein the one or more sugar alcohols is applied at a rate about 100 to about 100,000 grams per hectare.

8. The method of claim 3, wherein the one or more sugar alcohols is applied at a rate about 1,000 to about 30,000 grams per hectare.

9. The method of claim 3, wherein the one or more sugar alcohols is applied of about 6,800 grams per hectare.

* * * * *